United States Patent
Mielekamp et al.

(10) Patent No.: US 6,727,886 B1
(45) Date of Patent: *Apr. 27, 2004

(54) METHOD OF OPERATING AN INTERACTIVE IMAGE DISPLAY SYSTEM AND IMAGE SOURCE DEVICE FOR IMPLEMENTING THE METHOD

(75) Inventors: Pieter M. Mielekamp, Eindhoven (NL); Franklin H. Schuling, Eindhoven (NL)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1,038 days.

(21) Appl. No.: 08/553,281
(22) PCT Filed: Feb. 23, 1995
(86) PCT No.: PCT/IB95/00114
§ 371 (c)(1),
(2), (4) Date: Nov. 28, 1995
(87) PCT Pub. No.: WO95/27361
PCT Pub. Date: Oct. 12, 1995

(30) Foreign Application Priority Data

Apr. 1, 1994 (EP) .............................................. 94200904

(51) Int. Cl.⁷ .................................................. G09G 5/08
(52) U.S. Cl. ........................ 345/157; 345/555; 348/568
(58) Field of Search ................................. 345/132, 202, 345/157, 555, 327, 328; 348/391, 396, 568; 382/246, 309

(56) References Cited

U.S. PATENT DOCUMENTS

| 4,958,297 A | * | 9/1990 | Hansen ........................ 345/328 |
| 4,992,782 A | * | 2/1991 | Sakamoto et al. .......... 345/202 |
| 5,257,113 A | * | 10/1993 | Chen et al. |
| 5,512,921 A | * | 4/1996 | Mital et al. .................. 345/202 |
| 5,621,429 A | * | 4/1997 | Yamaashi et al. ........... 348/384 |
| 5,696,531 A | * | 12/1997 | Suzuki et al. ............... 345/132 |
| 5,724,070 A | * | 3/1998 | Denninghoff et al. ....... 345/202 |
| 5,745,610 A | * | 4/1998 | Johnson ...................... 382/309 |

FOREIGN PATENT DOCUMENTS

| EP | 0534139 A2 | 8/1992 | ............ G09G/5/14 |
| EP | 0572024 A2 | 12/1993 | ........... G06F/3/147 |

OTHER PUBLICATIONS

Brian C. Smith "Algorithms for Manipulating Compress Image" IEEE Computer Graphics & Applications. pp 34–42., 1993.*

ACM, Apr. 1991, vol. 34, No. 4, pp. 31–44 and pp. 47–58.

* cited by examiner

Primary Examiner—Amare Mengistu

(57) ABSTRACT

A method and device make it possible to show information interactively on a user terminal of an image display system, without requiring additional bandwidth for transmitting feedback information. The image display system includes an image source device and a user terminal connected to each other via a link. An input image signal and user command are received and, based on these, a further image signal representing an image part is generated. A compressed image signal is formed from the input image signal and an imposed image part. The compressed image signal is transmitted to the user terminal via the link where decompression occurs.

17 Claims, 3 Drawing Sheets

METHOD OF OPERATING AN INTERACTIVE IMAGE DISPLAY SYSTEM AND IMAGE SOURCE DEVICE FOR IMPLEMENTING THE METHOD

The invention relates to a method of operating an interactive image display system. The invention also relates to an image source device for implementing such a method.

BACKGROUND OF THE INVENTION

1. Field of the Invention

From the JPEG and MPEG standards (see e.g. communications of the ACM, april 1991 Vol. 34 no. 4 pages 31–44 and pages 47–58) it is known to compress images. These standards make it possible to reduce the amount of memory used to store images, for example in a video recorder or on an optical disk. After reading the image signal from the memory, it can be transmitted in its compressed form to a remote location. This occurs for example when a remotely located server providing video on demand serves to a user terminal such as a television set, possibly with a set-top box. In the user terminal the compressed signal is decompressed and displayed. The use of compression reduces the bandwidth required for transmission via the link between the image source device and the user terminal.

User terminals can be provided with a user control input, for example a handheld remote control unit, for entering user commands for controlling the functioning of the image source. Controlling the functioning may involve for example selection of sound volume, selection from a number alternative images or image sequences, selection from alternative language channels, controlling fast forward operation of a videorecorder etcetera.

The image display system can assist the user by providing information about available commands. The content of this information may be adapted after a command is actually entered, to show its effect and/or subsequently assailable commands. As this information depends on user actions, it is interactive. This information is generated by the image source device and is transmitted to the user terminal.

The MPEG standard provides private data streams which allow such information to be transmitted together with the compressed signal. This has the disadvantage that additional transmission bandwidth is needed for transmitting information about the commands.

2. Description of the Related Art

It has been known to provide the user terminal with means for overlaying on-screen display information over the image received from the image source device. This encompasses for example showing a bar representing the selected volume, showing menus of possible channel selections in which the actually selected item is highlighted, or showing images from the selected channel as a small "picture-in-picture" inside a currently displayed image.

Another application of interactive on-screen display is in games in which a user command dependent foreground item, such as an image of a puppet controlled by the user is super-imposed on a user-independent background such as a landscape through which the puppet is moved under control of the user commands.

SUMMARY OF THE INVENTION

It is an object of the invention to provide for a method and device which makes it possible to show information interactively on a user terminal of an image display system, without requiring additional bandwidth for transmitting feedback information.

The invention provides for a method of operating an interactive image display system, wherein the image display system comprises an image source device and a user terminal connected to each other via a link, the user terminal having a user control input, the method including the steps of receiving an input image signal representing an input image, receiving a user command from the user control input, generating a further image signal, dependent on the user commands the further image signal representing an image part, forming a compressed image signal representing an output image corresponding to the input image with the image part superimposed thereon in the image source device, transmitting the compressed image signal from the image source device to the user terminal via the link, for decompression of the compressed image signal and subsequent display of the output image, both at the user terminal. Thus interactive information is superimposed on the image at the side of the image source device and transmitted to the user terminal as one image, comprising both the original input image and the overlayed parts. Hence, on the whole no more bandwidth is required than for transmitting the input image. The method is particularly useful for image source devices that are located remotely from the user terminal, and that serve a plurality of user terminals with input image signals from a common source such as a magnetic disk, and that individualize the compressed images transmitted to individual user terminals by overlaying user terminal specific image parts.

In an embodiment of the method according to the invention in said receiving step, the input image signal is received in compressed form and further comprising the step of converting the input image signal into an at most partially decompressed input image signal. The forming step includes forming the compressed image signal by combining the at most partially decompressed input image signal and further image signal, whereby a required amount of computation for forming the compressed image signal from the input image signal is less than a further amount of computation that would be required for forming the compressed image signal from an uncompressed representation of the output image.

An additional advantage is that there are no jitter problems in positioning the image parts relative to the input image, such as occur in systems where the image parts are added to an input signal that is received as an analogue signal containing sync information.

It is to be noted that the operation of superimposing image parts on a compressed image without fully decompressing it is known per se, from a publication by B. C. Smith and L. A. Rowe, titled "Algorithms for Manipulating Compressed Images" in IEEE Computer Graphics and Applications (September 1993) pages 34–42, which is included by reference.

In a further embodiment of the method according to the invention the compressed image signal formed in said forming step contains a collection of compressed output blocks, each compressed output block representing a respective subimage of the output image, the collection including first compressed output blocks and at least one second compressed output block. The first compressed output blocks are copied identically from corresponding compressed input blocks from the at most partially decompressed input image signal, the at least one second compressed output block being formed in dependence on the further image signal. Thus the work required for forming the compressed image is limited because only the affected blocks need to be decoded and encoded in anyway at all; the other blocks remain unaffected. Preferably, the blocks are encoded using a Digital Cosine Transform (DCT) as in the MPEG and JPEG standards.

In an embodiment of the method according to the invention the image part is a graphical symbol, with a shape selected according to the user commands.

In a further embodiment of the invention said generating step includes selecting the compressed representation of the graphical symbol from among a set of compressed representations of alternative graphical symbols. Thus most of the computational work for forming the compressed image can be done prior to receiving the user commands. Reaction to the user commands can therefore be faster.

In a further embodiment of the invention the method further includes setting a selectable parameter pertaining to the input image, such as selection rum a number of alternative images, alternative language channels, brightness values, contrast values or sound volume values in dependence of the user command.

In an embodiment of the invention the generating step includes receiving a source image signal, the further image signal being generated by downsizing the further image. This is particularly useful for generating a picture in picture (PIP) display, showing one video channel as a relatively small window inside another video signal. The computational effort required for generating the downsized image in compressed form is less than required for compressing a full image.

The invention also provides for an image source device, having an image input for receiving an input image signal representing an input image, a command input for receiving user commands, generating means for generating a further image signal, dependent on the user command superimposing means for forming a compressed image signal representing the image with the image part superimposed thereon, an external output, and transmitting means, for transmitting the compressed image signal via the external output. This device implements the method.

The image source device can be used remotely, but also locally, being for example a videorecorder or a tuner that is connected only to one user terminal, for example a television monitor. In a system with more than one source device (video recorder, tuner etcetera), on screen display from each of the source devices can be transmitted to the user terminal (the monitor), without requiring extra bandwidth, and without decompression means capable of decompressing full images real time in all image source devices (tuner, video recorder etcetera). Only one such means is needed, in the user terminal (the monitor).

BRIEF DESCRIPTION OF THE DRAWINGS

The invention, its embodiments and advantages will be further described using drawings, of which

DESCRIPTION OF THE PREFERRED EMBODIMENTS

Figure 1:
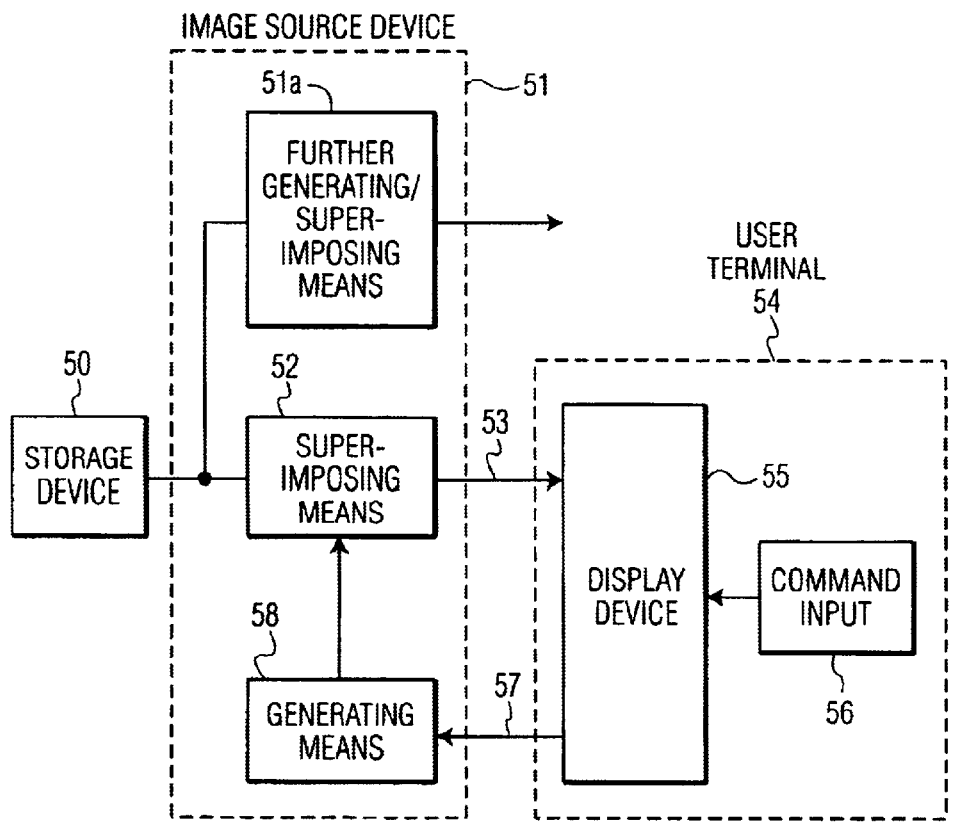
FIG. 1 shows an image display system.

FIG. 1 shows an imaged display system. This system contains a storage device 50, an image source device 51, a user terminal 54 connected to the image source device 51 via a link 53, 57. The user terminal 54 contains a command input 56, coupled to a display device 55. The image source device 51 contains generating means 58 and superimposing means 52, and further generating/superimposing means 51a.

In operation, an input image signal is retrieved from the storage device 50 and inputted in the image source device 51. The input image signal is processed by the superimposing means 52 and transmitted via the link 53, as a compressed signal (for example an MPEG or JPEG coded signal) to the user terminal 54, where it is decompressed and displayed.

The command input 56, which is for example a handheld remote control unit, receives user commands and feeds them to the display device 55. The display device 55 receives the commands and passes them to the image source device 51 via the link 57. The display device 55 need not pass all received commands to the image source device; some commands which are locally executable in the display device 55 may be executed locally without going to the image source device 51. The links 53, 57 may be combined in a single cable, but can also be separate transmission channels (for example a telephone line 57 and a video distribution cable 53).

In the image source device 51, the user commands are received and used to generate image parts in the generating means 58. These image parts are fed to the superimposing means 52, where they are used to form the compressed signal, which corresponds to the image part superimposed on the input image represented by the input image signal received from the storage device 50. Thus, the compressed signal, including the image parts, on the whole requires just as much transmission bandwidth as the original input image signal.

The image part may be a control symbol, with a shape selected in dependence on the user command. The image part may also be a menu with a content shaped in dependence on the user commands. The image part can also be an image of a puppet whose position and movement is controlled by the user commands as part of a game. Furthermore, the image part can be a further image, smaller than the input image represented by the input image signal and superimposed thereon as a PIP (Picture In Picture) image.

Simultaneously, the further generating/superimposing means 51a may be transmitting a further compressed image, derived from the same input image signal, but with other image parts superimposed on it, dependent on user commands from another user terminal (not shown).

In the user terminal 54, the display device 55 decompresses the compressed signal received from the image source device 51. Optionally, it displays further image parts super-imposed on the decompressed image, and generated dependent on locally executable user commands.

In an image encoding process as defined for example by the JPEG standard the image is divided into blocks of pixels. The fourier transform of the image intensity in each block is computed and quantized. The resulting transform coefficient are then subjected to further coding such as for example Huffman coding. The result is called the coded image. The code image is transmitted to a decoder, which performs a dequantization and an inverse fourier transform.

Figure 2:
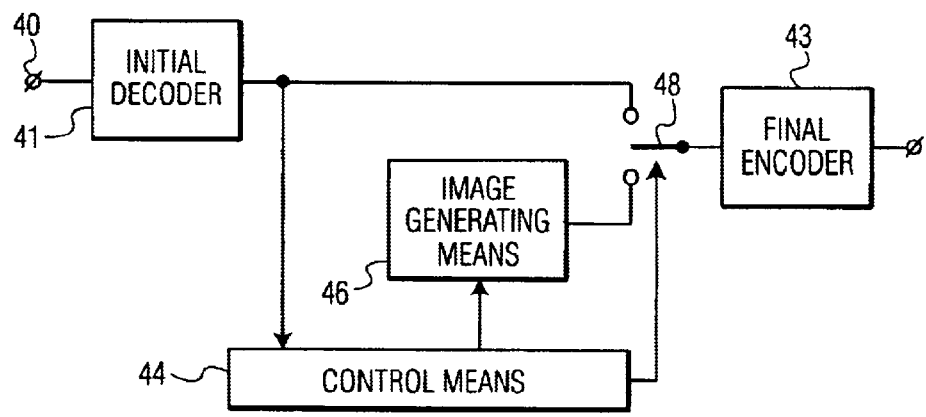
FIG. 2 shows an image source device.

FIG. 2 shows an image source device. This device has an input 40 for receiving the coded image. From the input the coded image is supplied to an initial decoder 41, which has an output coupled to control means 44 and a switch 48. The control means 44 feeds image generating means 46 and a control input of switch 48. The image generating means 46 is coupled to the switch which can connect either the output of the initial decoding means 41 or the output of the image generating means 46 to the input of a final encoder 43.

The initial decoder 40 decodes part of the code, such as the Huffman coding and dequantizes. The initial decoder 41 further supplies sets of fourier coefficients for respective blocks to its output. The control means 44 determines which block is being received and decides whether this block will remain unaffected or whether it will be changed. If the block is to be changed the control means 44 activates the image generating means 46 to generate a replacement block, and controls the switch 48 to substitute this block for the block output from the initial decoder. The resulting stream is encoded by the final encoder 43 which performs the inverse operation of the initial decoder 41. Normally the same quantization as in the image received at the input 40 may be received, but, if appropriate, the quantization may be adapted using a quantization which is selected to improve the visual effect of the inserted part of the image. Thus new image information is inserted in certain blocks of the image.

Figure 3:
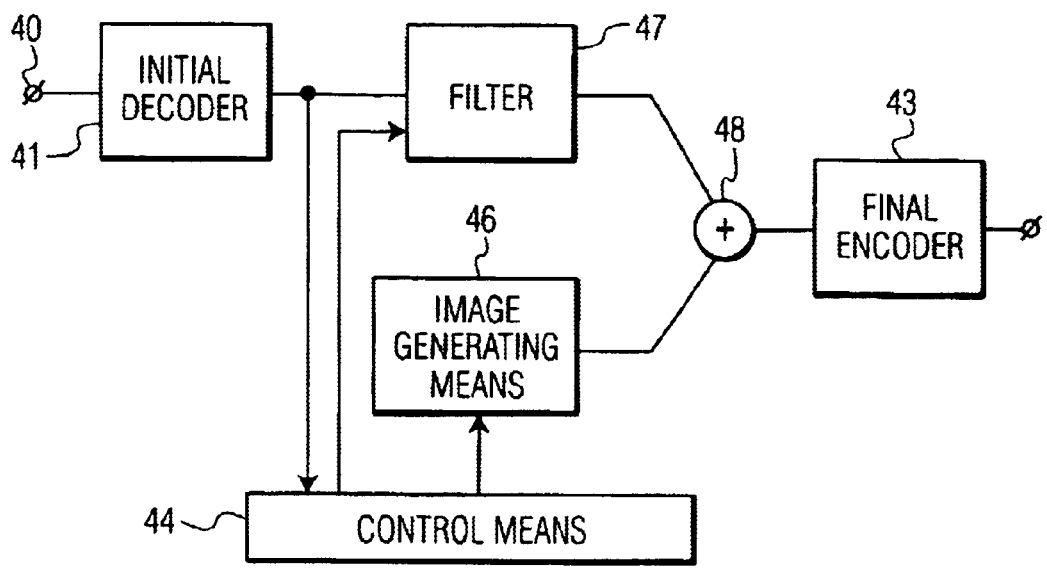
FIG. 3 shows an alternative image source device.

FIG. 3 shows an alternative image source device. This device is basically similar to the device of FIG. 2, but the switch 48 has been replaced by an adder 48. Between the initial decoder 41 and the adder 48 a filter 47 has been inserted.

In operation, the device adds the blocks derived from the coded image received at the input 40 to the blocks generated by the image generating means 46 upon a signal from the control means. The filter 47 may attenuate the blocks derived from the coded image received at the input 40. This attenuation may be frequency selective: for example the filter may delete the relatively higher frequency components of the blocks selected by the control means 44 and pass the lower frequency components. The filter 47 may also modify the selected blocks in another way.

The image generating means may generate blocks of fourier coefficients from various sources. In one version it may use another JPEG coded input image, passing only low frequency components to insert this other image in a window in the image received at the input 40. Alternatively, the image generating means 46 may obtain the blocks by encoding a small input image received in conventional pixel by pixel form. In yet another alterative, image generating means 46 may generate the block from model based graphics information.

Image models are used in a graphics system to generate an image part. A model can be built from a library of primitive shapes. In this case, a typical model contains a list of those shapes from the library that have to be rendered in the image, and for every shape it contains a position where this shape must be rendered and possibly a size and rotation under which this shape must be rendered. A first simplified example of a model is the following list ("V" at 0, "O" at 1, "L" at 2, rectangular-frame at 4, bar at 5) which contains five items, each composed of a reference ("V" etcetera) to a primitive shape in the library and a one dimensional position (at 0 etcetera).

Figure 4:
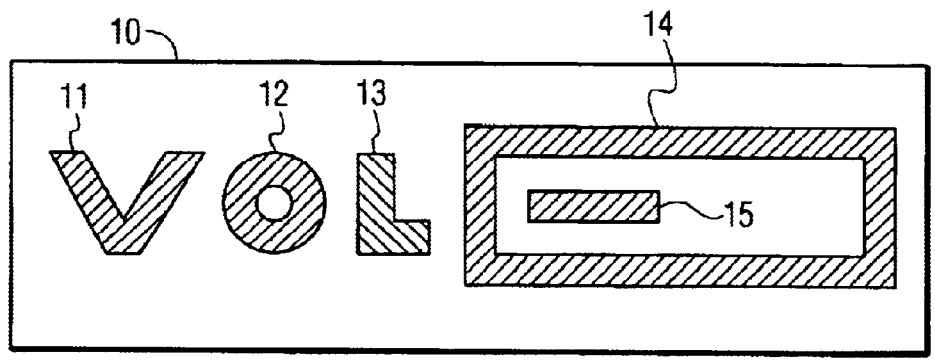
FIG. 4 shows an example of an image generated on the basis of a first model.

FIG. 4 shows an example of an image 10 generated on the basis of this first model. The image 10 contains three characters 11, 12, 13 (V,O,L) a rectangular frame 14 and a rectangle 15.

A second simplified example of a model is the following list ("V" at (0,0), "O" at (1,0), "L" at (2,0), disk at (5,0), pointer at (5,0) rotated over 45 degrees). In this list the items contain two dimensional position specifications and one item contains a rotation specification.

Figure 5:
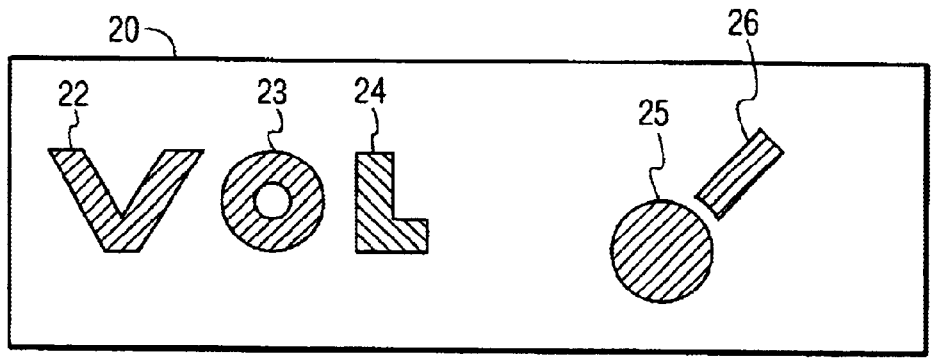
FIG. 5 shows an example of an image generated on the basis of a second model.

FIG. 5 shows an example of an image 20 generated on the basis of this second model. The image 20 contains three characters 22, 23, 24, a disk 25 and a pointer 26. It has been assumed that the location specification of the pointer 26 coincides with the centre of the disk 25, and that rotation of the pointer 26 involves rotation around this location specification. This means that, dependent on the rotation specification, the pointer 26 can be rendered at various angles relative to the disk 25.

The fourier transform of an image corresponding to a graphics model can be obtained by fourier transforming an image obtained by means of that model, or by generating the fourier transform directly from that model.

Figure 6:
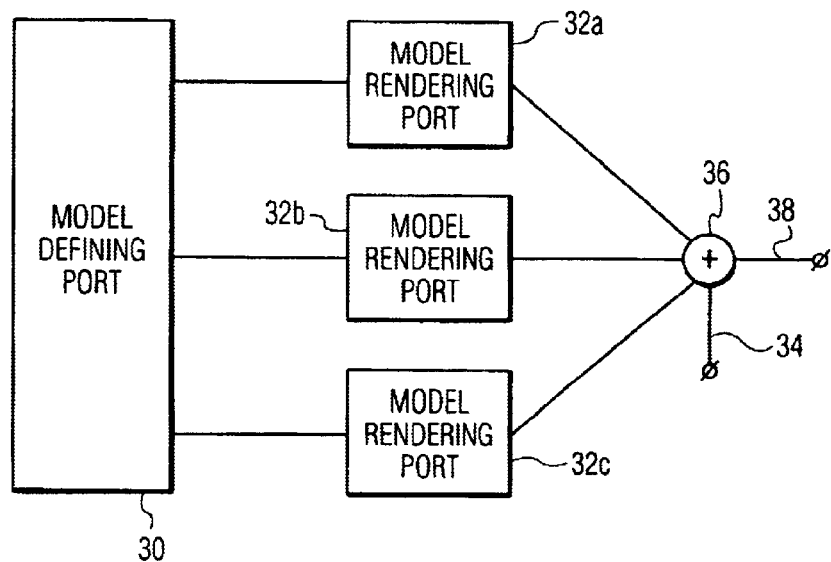
FIG. 6 shows a device for directly generating a fourier transformed version of model based images.

FIG. 6 shows a device for directly generating a fourier transformed version of model based images. This device contains a model defining part 30, which feeds three model rendering parts 32a, 32b, 32c, which have outputs coupled to an adder 36 which has a sum output 38. The adder 36 also has an input 34 for a background image.

In operation, each model rendering part 32a–c is associated with one of the primitive shapes. The model defining part 30 sends signals to those model rendering parts 32a–c whose associated shape must be rendered; the model defining part 30 sends these model rendering parts 32a–c parameters such as the coordinates of the location where these shapes should be rendered and if necessary the parameters of any affine transformation (this includes rotation and a resizing with a factor which may differ along two main axes).

The model rendering parts 32a–c store the fourier transform of the shape they are associated with. Using the parameters they receive, the model rendering parts 32a–c compute the fourier transform of those parts of the image that they are associated with.

This is based on the following, which will be explained in terms of fourier transforms for the sake of clarity. If an image $I_0$ (which assigns an intensity $I_0(r)$ to every pixel location r in the image, and which will informally be denoted by $I_0(r)$) of a primitive shape at location 0 with standard scale and rotation is given, then the image I(r) of this shape when it is translated over a vector p and transformed by an affine transform is given by $$I(r)=I_0(p+Ar)$$

where $$A\begin{pmatrix} x \\ y \end{pmatrix} = \begin{pmatrix} a_{xx}x + a_{xy}y \\ a_{yx}x + a_{yy}y \end{pmatrix}$$

represents the affine transform of a vector. The fourier transform F (which assigns a number F(k) to each spatial frequency k and which will be denoted informally as F(k)) of the image I(r) can be expressed in terms of the fourier transform $F_0(k)$ of the image $I_0(k)$ of the primitive shape as follows:

$$F(k) = \frac{1}{detA} e^{ikp} F((A^{-1})^T k)$$

When the fourier transform $F_0(k)$ of the image of the primitive shape is known it is therefore possible to generate the fourier transform F(k). If the fourier transform $F_0(k)$ is known only at sampling points, any known interpolation technique may be used to obtain F(k). In this way, each of the model rendering parts 32a–c can compute the fourier transform of those parts of the image that they are associated with.

The composition of an image from several primitive shapes is obtained by adding the images generated by different model rendering parts 32a–c in the adder 36. The fourier transform B(k) of a background image can be added to this image. Usually, this background image will be uniform; this means that only one component B(0) (for spatial frequency k=0) will differ from zero.

In principle, image intensity due to the background will also be present at those locations where a primitive shape is shown. This can be avoided by using a mask image. Each primitive shape affects only a limited area of the image $I_0(r)$. In the remaining area of the image it is for example zero. With the primitive shape one can associate a mask image M(r) which equals 1 everywhere where the image of the primitive shape differs from zero and is zero elsewhere. The mask image M(r) can be used to provide for a background to the images generated by the primitive shapes. If the background intensity is to be uniformly BG, except for where the primitive object is shown then BG times M(r) should be subtracted from the image I(r) of a primitive shape. This subtraction can be performed in the model rendering parts 32a–c in the fourier transformed image F(r) or preferably in $F_0(r)$. For this purpose, the model defining part 30 will also send the uniform background intensity BG to the model rendering parts 32a–c.

If the background image is not uniform, then it should be multiplied by a composite mask defined as I minus the sum of the masks of the primitive shapes that are shown. In the fourier transform domain this involves computing the convolution $$\int dk' CM(k')B(k-k')$$

of B(k) with the fourier transform CM(k) of this composite mask.

For an acceptable visual effect this convolution may be restricted to only the relatively low frequency components of the fourier transform CM(k) of the composite mask; the other components of CM(k) may be treated as if they are zero. In this way the masking of the background will be only approximate near the edges of the primitive shapes, however, this will be visually hardly noticeable. Moreover, convolution may be restricted to the relatively higher frequency components of the background B(k) as only these cause disturbing visual effects in the image.

In a number of applications a primitive shape may have to be shown more than once. This occurs for example if the primitive shape occurs more than once in the model, or if it needs to be "brushed", that is, shown at a collection V of points r (belonging to V) in the image. In the fourier transform domain this corresponds to multiplying the fourier transform F(k) of the primitive shape for each spatial frequency by a factor a(k)

$$a(k) = \sum_{r \in V} e^{ikr}$$

For the whole collection V the factor a(k) can be computed in the model this needs to be performed only once in the appropriate model defining part and transmitted to the rendering part 32a–c for performing the multiplication.

Obviously, instead of by the architecture according to FIG. 6, the same result may also be obtained by an appropriately programmed general purpose computer or signal processor.

Figure 7:
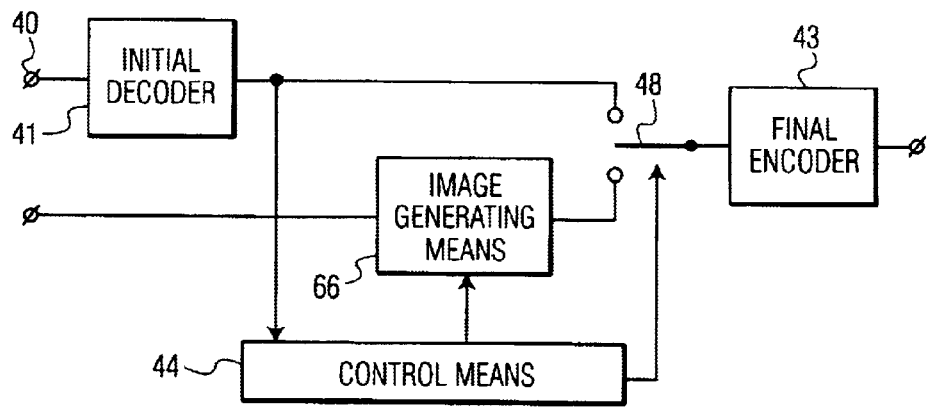
FIG. 7 shows an image source device for generating PIP (Picture in Picture) images.

FIG. 7 shows an image source device for generating PIP (Picture in Picture) images. The structure of this device is similar to the device of FIG. 2, except that the image generation means 46 is replaced by image reduction means 66.

In operation the image reduction means receives a further input image, which is downsized, for example by subsampling with a linear factor of 3 or 4 (so that the area of the image is reduced by a factor of 9 or 16). A compressed version of the downsized image is formed, made up of a numbs of DCT transformed blocks, this number being smaller than the number of blocks in a full image. The control means 44 controls the switch so that a number of blocks from the input image signal is replaced by the blocks of the compressed version of the further input image. Thus a compressed image is formed in which the further input image is shown with reduced size in the input image received from input 40.

In principle, the blocks of the downsized image may be obtained by compressing a subsampled version of the further input image. Since only a small number of blocks need be formed (e.g. ⅑th or ¹⁄₁₆th of the total number of blocks in an image) this does not impose an excessive computational overhead for compression.

However, this computational overhead may be further reduced if the further input image is received in compressed form. In this case downsizing can be effected without fully decompressing the further input image. The downsizing factor is preferably chosen such that each block in the compressed version of the downsized image is composed of an integer number of source blocks from the full-sized image. Each of the transform values in this downsized block is the sum of contributions from the individual source blocks making up that block, on the basis of the formula $$F(k) = \sum_j e^{ikp_j} FR_j(k)$$

Where j runs over the source blocks that make up the downsized block and $p_j$ represents the relative positions of the source blocks. FR is the transform of the downsized block. This is based on the formula for the fourier transform of a downsized block, given by the earlier formula:

$$FR(k) = \frac{1}{detA} e^{jkp} F\left((A^{-1})^T k\right)$$

Where the matrix A is a unit matrix multiplied by the scaling factor (e.g. 3 or 4) by which the image is downsized. In addition, to avoid aliassing the amplitudes of the coefficients FR(k) of the higher spatial frequencies k are preferably reduced in amplitude relatively to the amplitudes of the coefficients of the lower spatial frequencies.

Thus, she blocks that are inserted in the input image signal received from the input 40 can be computed without fully decompressing the further input image which is inserted.

The technique of altering the image can also be applied to compressed moving images such as encoded for example using the MPEG standard. The MPEG standard defines Intra coded images (I-images) Predictive coded images (P-images) and bidirectionally coded images (B-Images). The I-images are coded basically in the same way as JPEG images and can be altered as described hereinbefore. The P-images and the B-images are obtained with the help of I-images, using motion information. The MPEG code contains motion vectors, which describe the motion of blocks of pixels. The P-image is obtained in the decoder by taking an I-image and moving these blocks according to the motion vector specified for them. The MPEG code furthermore contains a prediction error signal, which is used in the decoder to correct the differences between the original image and the P-image obtained by moving blocks of pixels.

When information is inserted in the encoded images, it is desirable to alter the motion information and/or the prediction error as well. Otherwise one would find that during interpolation or prediction, information from outside the area of the image that was altered, drifts into that area, or inserted information drifts out of that area.

In its simplest form this can be prevented by monitoring the original coded image for motion vectors which point into or out of areas that have been changed and to suppress these vectors from the resulting coded image (replace them by zero motion). If there are no significant motions the prediction error signal may be left unaltered. If the information inserted in the resulting image changes in time, one may also add motion vectors to the coded image which represent movement inside the altered area.

In an improved form, one accumulates the changes in the original coded image for the blocks in the altered areas and the blocks in the surroundings of the altered areas in a separate buffer. This involves both motion and prediction errors, and requires inverse fourier transform. In principle, this can be done with a standard MPEG decoding algorithm (which can be relatively easily implemented, because it needs to be performed only on a subset of all blocks in the image); alternatively it can be performed without using full decoding, in particular without applying the inverse DCT, using convolution operators applied to the coded signal. If the original coded image changes in the surroundings of the altered area due to motion form inside the altered area, then one generates a prediction error signal in the resulting coded image by subtracting the blocks computed by accumulation with the blocks transmitted as part of a preceding I-image. The difference is fourier transformed quantized and inserted in the resulting coded image. This ensures that the resulting coded image corresponds to the original coded image in those surrounding areas.

If the altered information is to be removed from the image at a certain point in time, then the original information can be restored using the accumulated changes.

In summary, it can be said that it has been known in the art to construct image information by overlaying the pixels of different images. In this case a part of the pixels retain the intensity information of a background image, and the intensity information of other pixels is replaced by intensity values of a foreground image.

In one example of an application of this technique, computer systems overlay a background image with windows containing additional information. In another example, television sets provide for PIP (picture in picture) in which a background image from one image source is overlayed with information from a second image source. In a further example, various image sources such as video-recorders, television tuners etcetera provide for "On Screen Display", in which graphically generated control symbols are superposed on a background image to allow a human user to interact with the control interface of the source.

In the art it is furthermore known to compress images. Compression techniques allow images to be transmitted with relatively little bandwidth or stored occupying relatively little space on a video recorder, a hard disk or any other storage device.

When the compressed image is displayed on a monitor, it is first decompressed, to obtain a "bitmapped image" containing an intensity and/or colour value for every pixel location. This bitmapped image is used to control the monitor.

The decompressor hardware constitutes a considerable overhead for the system, and transmission of decompressed images between the sources and the monitor requires considerable bandwidth. Therefore it is desirable to provide only one decompressor in each system, preferably integrated with the monitor.

However, this means that it is no longer possible to edit the pixels of the images to provide for overlay information. For a system with on screen display of control information this means that the control information must either be transmitted separately to the monitor, or that the image must be decompressed in the image source in order to edit the pixels.

Therefore, amongst others, it is an effect of the invention to reduce the number of decompressors required in an image display system.

It is a further effect of the invention to provide for an image display system in which additional information can be inserted by an image source in the image produced by that source without requiring a full decompressor in that image source.

The image display system, contains an image source coupled for feeding a display device, the image source having input means for obtaining a compressed two dimensional original image, the image source being arranged for forming a compressed two dimensional resulting image by inserting image information into the compressed original image, and for supplying the resulting image to the display device, which contains a decompressor for decompressing the resulting image for display. The orginal and the resulting image contain a plurality of coded blocks of pixels, the image source containing a image generating means, and being arranged for replacing selected blocks from the original images by blocks generated by the image generating means, and leaving the remaining blocks unaffected.

In case the input means are arranged for obtaining a signal representing a compressed sequence of two dimensional images, such as an MPEG sequence, of which the original image is a part, and wherein other original images from the sequence are represented by motion vector relative to the compressed two dimensional image, the image source is arranged for generating a resulting sequence from the original sequence by modifying the motion vectors relating to the selected blocks.

Preferably, the image source contains accumulating means for accumulating information about the selected blocks in the images of the original sequence and their surroundings, and prediction error inserting means for inserting prediction error signals derived from the accumulated information in the resulting stream.

What is claimed is:

1. A method of operating an interactive image display system, the image-display system comprising an image source device and a user terminal connected to said image source device via a link, the user terminal having a user control input, the method comprising the steps of:

(a) receiving an input image signal representing an input image;

(b) receiving a user command from the user control input;

(c) generating a further image signal, dependent on the user command, the further image signal representing an image part, the further image signal being modifiable based upon said user command;

(d) forming a compressed image signal in the image source device, said compressed image signal representing an output image corresponding to the input image with the image part superimposed thereon; and (e) transmitting the compressed image signal from the image source device to the user terminal via the link, said transmission allowing for decompression of the compressed image signal and subsequent display of the output image, both at the user terminal.

2. A method according to claim 1, wherein:

in said receiving step (a), the input image signal is received in compressed form and step (c) further comprises the step of converting the input image signal into an at most partially decompressed input image signal, said forming step (d) comprising forming the compressed image signal by combining the at most partially decompressed input image signal and further image signal, such that a required amount of computation for forming the compressed image signal from the input image signal is less than a further amount of computation that would be required for forming the compressed image signal from an uncompressed representation of the output image.

3. A Method according to claim 2, wherein the compressed image signal formed in said forming step (d) contains a collection of compressed output blocks, each compressed output block representing a respective subimage of the output image, the collection comprising first compressed output blocks and at least one second compressed output block, the first compressed output blocks being copied identically from corresponding compressed input blocks from the at most partially decompressed input image signal, the at least one second compressed output block being formed in dependence on the further image signal.

4. A Method according to claim 3, wherein each compressed output block contains a discrete cosine transform, of its respective subimage.

5. A Method according to claim 3, wherein the at least one second compressed output block is formed by combining a compressed representation of the image part with a corresponding further compressed input block from the input image signal.

6. A Method according to claim 1, wherein said generating step (c) comprises generating a graphical symbol having a shape selected in response to the user command, the graphical symbol being the image part.

7. A Method according to claim 6, wherein said generating step (c) comprises selecting the compressed representation of the graphical symbol from among a set of compressed representations of alternative graphical symbols.

8. A Method according to claim 7, further comprising setting a selectable parameter pertaining to the input image, such as selection from a number of alternative images, alternative language channels, brightness values, contrast values or sound volume values based on the user command.

9. A Method according to claim 1, wherein the generating step (c) comprises receiving a source image signal, the further image signal being generated by downsizing the further image.

10. A Method according to claim 9, wherein the source image signal is received in compressed form, the further image signal being derived from an at most partially decompressed version of the source image signal, the compressed image signal being formed by combining the at most partially decompressed input image signal and further image signal which representing the image part in compressed form.

11. An image source device comprising:

an image input for receiving an input image signal representing an input image;

a command input for receiving user commands;

generating means for generating a further image signal, dependent on the user command, the further image signal being modifiable based upon said user command;

superimposing means for forming a compressed image signal representing the input image with the further image signal superimposed thereon;

an external output; and transmitting means for transmitting the compressed image signal via the external output.

12. An image source device according to claim 11, wherein the input image signal is received in compressed form; and said image source device further comprises conversion means for converting the input image signal into an at most partially decompressed input image signal, wherein the superimposing means are arranged for forming the compressed image signal by combining the at most partially decompressed input image signal and the further image signal, such that a required amount of computation for forming the compressed image signal is less than a further amount of computation that would be required for forming the compressed image signal from an uncompressed representation of the output image.

13. An image source device according to claim 12, wherein the superimposing means are arranged for forming a collection of compressed output blocks, each compressed output block representing a respective subimage of the output image, the collection comprising first compressed output blocks and at least one second compressed output block, the superimposing means copying the first compressed output blocks identically from corresponding compressed input blocks from the at most partially decompressed input image signal, the superimposing means forming the at least one second compressed output block in dependence on the further image signal.

14. An image source device according to claim 11, wherein the generating means comprises graphics image generating means for generating a graphical symbol with a shape selected in response to the user command, the graphical symbol corresponding to the image part.

15. An image source device according to claim 14, wherein the graphics generating means comprising a memory storing a set of compressed representations of alternative graphical symbols, the graphics generating means being arranged for reading the graphical symbol form the memory under selection by the user command.

16. An image source device according to claim 11, wherein the generating means comprise:

source receiving means for receiving a source image signal representing a further images, and downsizing means for downsizing the source image into the further image signal, the part image corresponding to a downsized version of the further image.

17. Image source device according to claim 16, wherein the source image signal is received in compressed form; and the downsizing means forming. The further image signal in compressed forms, derived from an at most partially decompressed version of the source image.

* * * * *